United States Patent [19]

Lampeas

[11] 4,369,902
[45] Jan. 25, 1983

[54] RETRACTABLE LOAD CARRIER FOR VEHICLES

[76] Inventor: Steve Lampeas, 117 Aldershot La., Manhasset, N.Y. 11030

[21] Appl. No.: 232,276

[22] Filed: Feb. 6, 1981

[51] Int. Cl.³ ............................................. B60R 11/00
[52] U.S. Cl. ............................ 224/42.42; 224/42.43; 224/311; 296/26
[58] Field of Search ............... 224/42.42, 42.43, 42.44, 224/273, 311, 320; 296/3, 7, 26, 37.1, 37.5; 362/64, 73, 80, 83

[56] References Cited

U.S. PATENT DOCUMENTS

| | | | |
|---|---|---|---|
| 1,943,440 | 1/1934 | Horni | 362/83 |
| 2,518,624 | 8/1950 | Kraft | 296/3 |
| 2,576,385 | 11/1951 | Bigsby | 296/37.1 |
| 2,729,499 | 1/1956 | Eggum | 296/26 |
| 2,852,303 | 9/1958 | Hopson | 296/26 |
| 2,997,332 | 8/1961 | Schlumbohm | 362/74 |
| 3,158,302 | 11/1964 | Dickerson | 224/42.43 |
| 4,029,245 | 6/1977 | Berlin | 224/42.43 |

FOREIGN PATENT DOCUMENTS 1240545  8/1960  France ............................ 224/42.43

*Primary Examiner*—William Price
*Assistant Examiner*—Gary E. Elkins
*Attorney, Agent, or Firm*—Thomas M. Galgano; Allison C. Collard

[57] ABSTRACT

A retractable load carrier for the cantilever support of loads from the rear of a vehicle, consisting of a pair of spaced-apart, elongated channel supports, disposed from the rear of the vehicle in the direction of travel. Each support consists of a plurality of elongated, hollow, rigid channels which nest one within the other, and are supported on a pair of brackets which are mounted within the rear of the vehicle. The brackets are detachably secured to flanges, which are bolted to the frame of the car. The individual channels can be telescoped outwardly, so that when fully extended, either shear pins or snaps will prevent adjacent channels from becoming disengaged. Lamps can be disposed either on the channels or the channels can be provided inside the vehicle behind each of the taillights, so that the taillights can be pulled out, thereby pulling out the channels.

13 Claims, 8 Drawing Figures

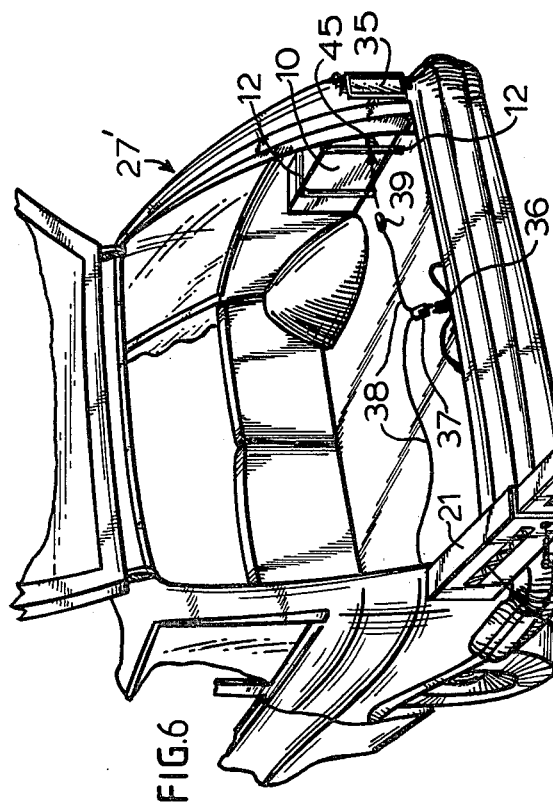
FIG.6
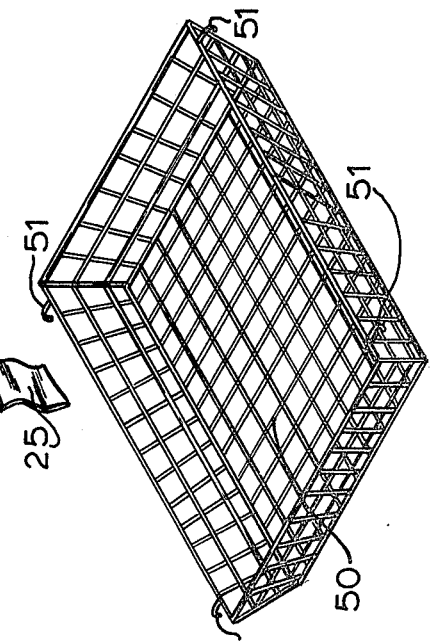
FIG.7
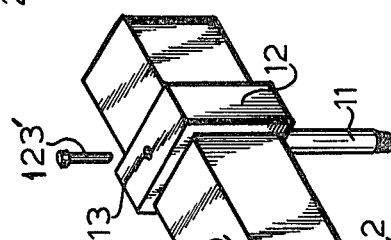
FIG.5
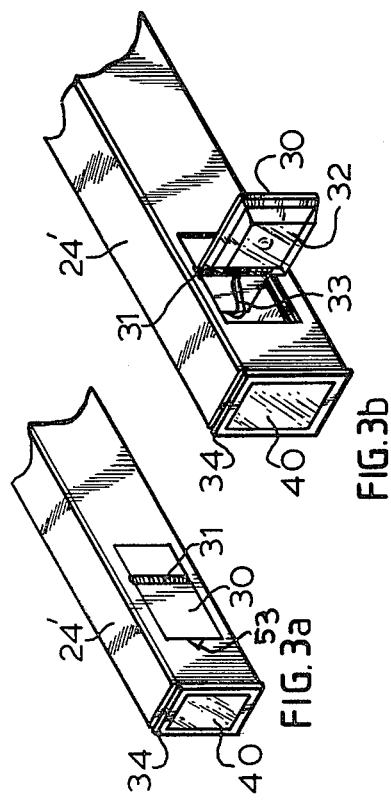
FIG.3a
FIG.3b
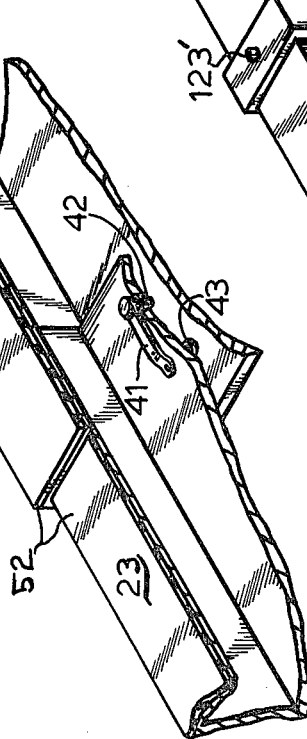
FIG.4

RETRACTABLE LOAD CARRIER FOR VEHICLES

This invention relates to an equipment carrier for connection to the back of a standard automobile. More specifically, this invention relates to a carrier connected to the back of an automobile, consisting of telescoped channel brackets which can be extended off the back of a vehicle to the desired length, for supporting loads of various size.

In a standard vehicle, it often becomes necessary to transport equipment or loads which cannot fit inside of the trunk or passenger-carrying compartment of the vehicle, due to the space available. This problem becomes particularly acute with smaller vehicles that are becoming available due to the present fuel shortage. Occasionally, the user of an automobile requires additional space for carrying such items as camping equipment, boats, building supplies, etc. Usually, this additional load is only required to be carried for relatively short distances and for a short period of time, to accommodate a particular need of the user.

In the prior art, there are various types of load-carrying devices for attachment to automobiles, both off the back of the car and as luggage racks. Specific examples of these are described, for example, in U.S. Pat. Nos. 1,474,929, 3,176,903, 3,194,346, 3,554,415, 3,820,833 and 4,125,214.

Most of these prior art devices require permanent attachment to the vehicle or suffer from the disadvantage in that the brackets needed to support these attachments often remain permanently attached to the vehicle, interfering with other load-carrying spaces, which may later be needed in the vehicle. Moreover, most of these prior art devices are only suitable for loads of a specific size and weight, and cannot be adapted for loads of different weights and lengths. Many of these prior art devices are also hazardous to use in that they do not provide auxiliary taillights extended off the back of the car, to warn approaching drivers from the rear of the additional length of the vehicle.

Accordingly, the present invention provides an adjustable, telescoping, load-carrying device, consisting of a pair of parallel, spaced-apart channels which can be extended to the desired length, for carrying loads of a large number of different sizes off the back of the vehicle. Moreover, the present invention can be easily disassembled and stored out of the way when not in use, so that the brackets and attachments of the present invention do not interfere with the other load-carrying capabilities of the vehicle. In a further particular embodiment of the invention, the load-carrying channels of the invention can be made a natural extension of the taillights of the vehicle, so that the taillights with the channel brackets can be extended off the rear of the vehicle to the length desired.

It is therefore an object, according to the present invention, to provide a load-carrying device for attachment to the back of a vehicle, consisting of a pair of parallel, spaced-apart telescoping channels adaptable to fit a large variety of loads.

It is another object, according to the present invention, to provide a load-carrying device which is simple in design, inexpensive in cost and efficient in operation.

Other objects and features of the present invention will become apparent from the following detailed description considered in connection with the accompanying drawings, which disclose the embodiments of the invention. It is to be understood that the drawings are to be used for the purposes of illustration only, and not as a definition of the limits of the invention.

In the drawings, wherein similar reference characters denote similar elements throughout the several views:

FIG. 3a is a detailed view of the end of one channel bracket with a taillight in a closed position;

FIG. 3b is a detailed view of the channel bracket of FIG. 3a, with the taillight opened and in operation;

FIG. 4 is a cross-sectional view taken through two telescoping sections of the channel, showing the locking mechanism between the channels;

FIG. 5 is a detailed view, showing the mounting of channels within the vehicle;

FIG. 6 shows another embodiment of the invention connected through the rear taillights of the vehicle, and, FIG. 7 shows a carrying basket for hooking between extended channels.

Figure 1:
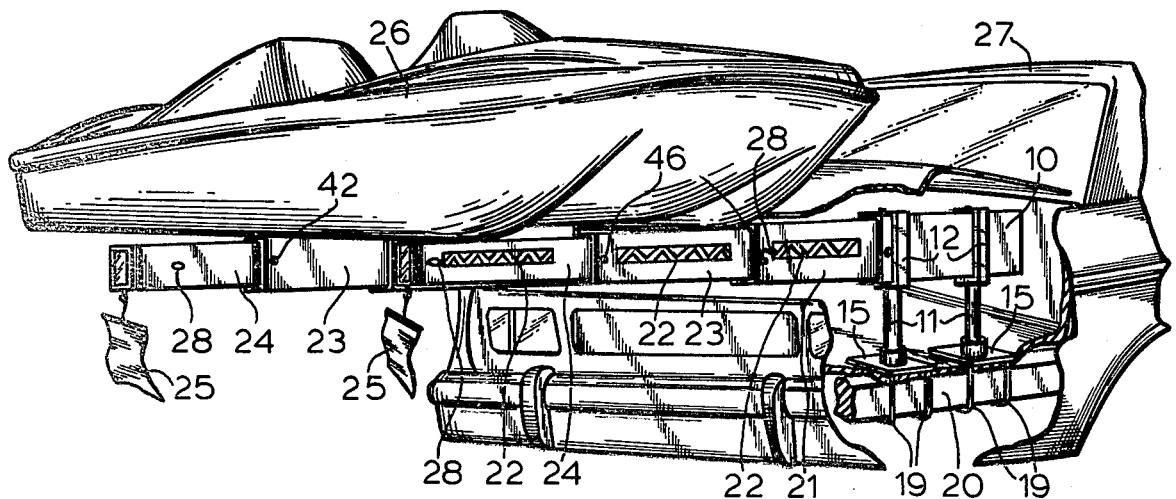
FIG. 1 is a perspective view, partially in cross-section, showing a first embodiment of the subject invention.
Figure 2:
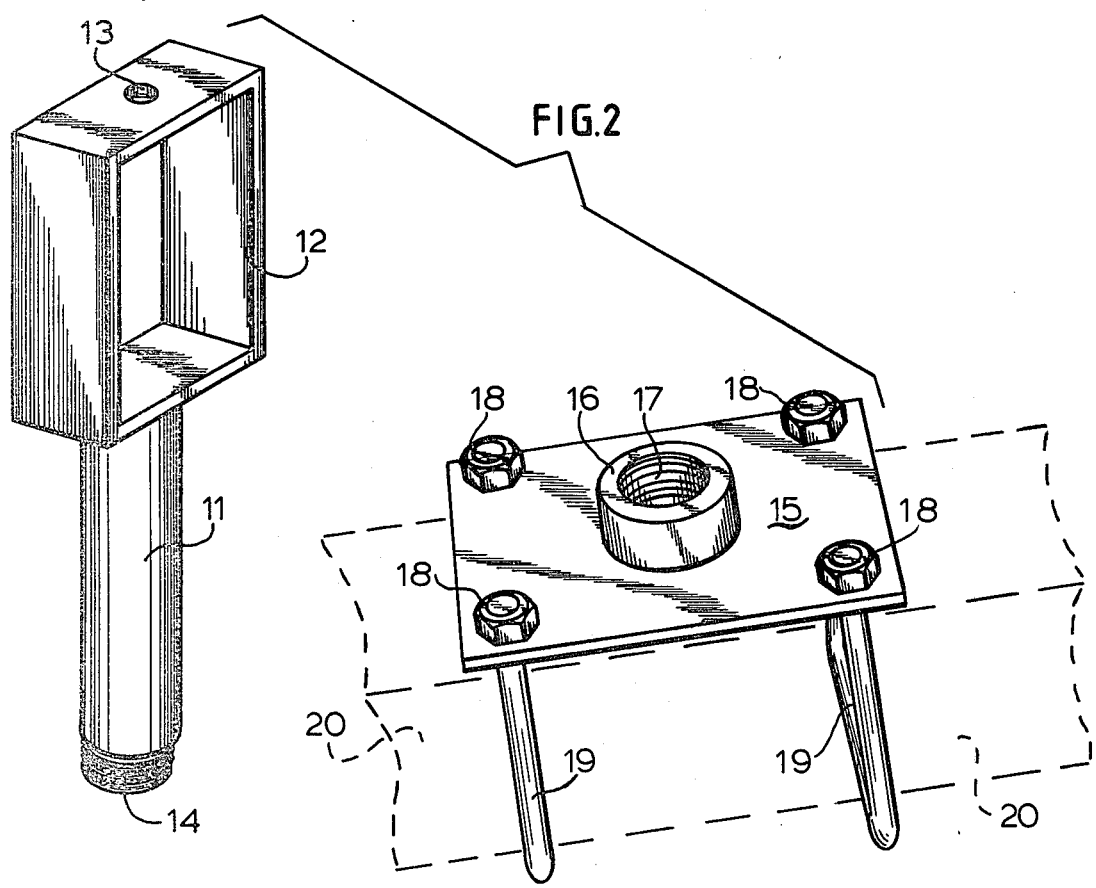
FIG. 2 is a detailed view of the brackets used in the invention of FIG. 1.

Referring to FIGS. 1 and 2, there is shown the telescoping load-carrying support channels, according to the present invention, mounted in a main channel 10, supported by at least two rectangularly-shaped brackets 12, mounted on posts 11 and threadably coupled into flanges 15. Flanges 15 are each provided with bushings 16, having female threads 17, for demountably receiving the threaded ends 14 of post 11. Each of flanges 15 includes U-shaped bolts 19, which are designed to couple to the frame 20 of vehicle 27, through the trunk of the vehicle. Each flange 15 preferably includes two U-shaped brackets 19, which are threaded at their ends and fit through corresponding openings near the ends of the flanges, for connection to hexagonal nuts 18.

Channel 10 is preferably rectangular hollow section constructed of a rigid material, such as steel or aluminum, and is designed to receive telescoping channels 21, 23 and 24, which are designed to be pulled out from the center of channel 10. Channel 21 is also rectangular and designed to slidably fit within the interior of rectangular channel 10, and also to receive a second channel 23. Channel 23 is designed to slidably fit within channel 21. In the same manner, channel 24 is designed to slidably fit within channel 23.

Optionally, each of the channels may be provided with reflective striping 22, so that they can provide warning to vehicle approaching from a right angle, as to the extension off the back of the vehicle. Each vehicle is preferably provided with two identical telescoping channels, and, in the present embodiment, these channels are preferably either square or rectangular in cross-section.

While only four channels are shown, three of which are telescoping, it is obvious that additional telescoping channels may be provided, depending upon the length or width of the load to be carried. Holes or apertures 28 may be provided on the inside of the telescoping channels, so as to support between the channels, a carrying basket such as shown in FIG. 7, so that smaller parts or items can be carried.

In the present invention, a boat 26 is shown supported between the telescoping rectangular channels of the present invention. For the purposes of simplicity, the ropes or straps holding the boat to the channels have been omitted. At the ends of each of the channels are also shown red flags 25, since certain state laws require the display of these flags during the daytime, to warn other motorists of the extending members of the vehicle.

As an optional feature to the invention, taillights may also be included at the rear or adjacent to the rear of the last channel. As shown in detail in FIG. 3a, the back of the last telescoping channel member 24' may be provided with a transparent lens 40, so that a light contained in flap 30, will shine through the lens, to provide both taillights and braking lights showing through the lens. A hinge 31 may also be provided for access to the lights.

As shown in detail in FIG. 3, the lights may also be opened out from the side of the section, as shown by lamp 32 connected to cable 33, which connects through the telescoping members to the brake light and taillight systems of the vehicle 27. A simple spring can be provided in hinge 31 to maintain the light open, as shown in FIG. 3b. A latch 53 is provided on the latch cover to keep the lamp closed when not in use. Both of the last telescoping sections 24', as shown in FIGS. 3a and 3b, may also be provided with a slightly enlarged end flange 34, which will facilitate the user to grip the end flange 34 with his fingers, when pulling out the telescoping sections for use.

Different means can be used to lock the telescoping sections from further extension, and one of such type means is shown in FIG. 4. Between telescoping channel sections 21 and 23, as shown in detail in cross-section, can be provided a spring-loaded snap 41, having one end secured inside channels 23 and its pawl 42, disposed through an opening in that channel, for connection to a corresponding hole 43, formed in the bottom of channel 21. Thus, when the channels are pulled out in telescoping fashion, pawl 42 will slide along the inside bottom surface of channel 21 until it engages into hole 43, preventing further withdrawal of those two sections as they are pulled out, so that there is still a mechanical overlap between adjacent channels. When the telescoping channels are to be collapsed, it is only necessary to push against pawl 42, either with one's finger or with a small pointed object, in order to release the channels, so that they can be collapsed into each other, as shown in detail in FIG. 5. A thin layer of rubber padding 52 is also shown secured to the top surface of channels 21 and 23, so as to cushion objects being carried on the rails.

Referring in detail to FIG. 5, posts 11 connected to spaced-apart rectangular brackets 12, which support main hollow rectangular channel 10, can be designed to give a slight angular incline to the telescoping sections, in order to off-set the spring sag of the car for normal loads, which will be supported on the telescoping channels of the present invention. Each of the rectangular brackets can also be provided with apertures 13 at their top surface, in order to receive shear pins 123, which will prevent main channels 10 from movement within brackets 12. An electrical connector post 45 can also be provided against the side of channel bracket 10, so that both taillight and stoplight electrical power can be provided to the sliding channels through loose wire couplings.

As shown in detail in FIG. 6, bracket can also be provided through standard taillights, if the manufacturer designs the taillights to accommodate the telescoping channels. In this embodiment, taillights 35 are mounted at the ends of the last telescoping channel 24, and can be easily pulled out to the desired position, if they are needed. Adjacent to the ends of each channels 21 and 23, are provided threaded holes, so that shear pins 123 can be secured into these holes in order to limit the withdrawal of the succeeding channels to the desired size. These pins will also shear if the vehicle is accidentally hit in the rear, so that channels can collapse and close up to the back bumper of the vehicle. Pins 123 are designed to shear in the event of a rear end collision, whereas pins 123' are designed to return channel 10 within brackets 12.

As shown in the back portion of the vehicle 27', the taillight connector 37, having wires 38, can be provided at their ends with connectors 39, to fit into suitable connectors 45 on main channels 10, to complete the electrical circuit for the stoplights and brakelights. In this embodiment, main channels 10 and their associated brackets 12 can be left as a permanent installation, since they are mounted in a place which takes very little trunk space of the vehicle.

FIG. 7 shows a wire basket 50 having at least 4 hooks 51, which can be attached and demountably secured to the telescoping beams in order to hold smaller objects between the extending channels.

In the embodiments of FIGS. 1-5, however, it would be easy to disassemble the brackets from the trunk of the vehicle, when they are not needed, by merely pulling out pins 123' from channels 10, sliding out the channels from rectangular brackets 12, and then unscrewing each of the four brackets 12 from flanges 15, and storing the entire assembly in the user's garage or under the back seat of the vehicle.

All of the hardware of the present invention is preferably constructed of rigid metal materials, such as steel or aluminum. The channels are shown both as hollow rectangular and square channels. The invention can also use a nontelescoping, fixed beam of a predetermined length, if so desired.

The present invention may be provided as optional original equipment by the manufacturer of the vehicle, or may be provided by the after-market automobile field, as an accessory item. It is particularly useful for carrying building supplies and camping equipment, and eliminates the need for ownership of a truck or station wagon vehicle, which is customarily used for carting these types of loads. The invention further eliminates the use of trailers, additional licensing fees and insurance. When not in use, the brackets which hold and support the channels can be easily disassembled and stored in the trunk of the vehicle.

While only a few embodiments of the present invention have been shown and described, it is obvious that many changes and modifications may be made thereunto without departing from the spirit and scope of the invention.

What is claimed is:

1. A retractable, self-supporting load carrier for cantilever support of loads from the rear of a vehicle having a trunk and a pair of taillight openings, comprising:

a pair of spaced-apart, elongated telescoping, independently-operable channel supports disposed in the direction of travel of the vehicle, each support having a plurality of elongated, hollow, rigid channels telescopically received and nesting one within the other, said channel support being mountable within the trunk of said vehicle such that they are in alignment with one of said openings through which said channels may extend;

a lamp coupled to the innermost channel adjacent to an outwardly-directed end thereof; and bracket means coupled to the outside channel of each telescoping support for securing said support to said vehicle within the trunk thereof.

2. The load carrier as recited in claim 1, wherein each of said hollow channels includes stop means for preventing withdrawal on one channel from within its adjacent channel.

3. The load carrier as recited in claim 1, wherein said stop means comprises a spring loaded snap having a pawl and a corresponding hole formed adjacent to the end of each of said channels for receiving said pawl when the channel has been withdrawn and extended out of its adjacent channel.

4. The load carrier as recited in claim 1, wherein the top surface of each of said channels includes cushion material secured thereto.

5. The load carrier as recited in claim 1, wherein at least one side of at least one channel includes reflective material.

6. The load carrier as recited in claim 1, wherein said lamp additionally includes a spring loaded, hinged door formed in the side of said end channel for supporting said lamp.

7. The load carrier as recited in claim 2, wherein the adjacent overlapping ends of said channels include holes that come into alignment, and said stop means comprises a shear pin inserted through each aligned hole of said adjacent channels.

8. The load carrier as recited in claim 1, additionally comprising a rectangular basket for disposal between said extending channel supports, and means for demountably securing said basket to said channel supports.

9. The load carrier as recited in claim 1, wherein said bracket means are demountably attached to a base wall of the trunk of said vehicle.

10. A retractable load carrier for cantilever support of loads from the rear of a vehicle, comprising:

a pair of spaced-apart, elongated telescoping channel supports disposed in the direction of travel of the vehicle, each support having a plurality of elongated, hollow, rigid channels nesting one within the other;

a lamp disposed in at least one of said channels;

a spring-loaded hinged door formed in the side of the innermost channel for supporting said lamp; and bracket means coupled to the outside channel of each telescoping support for securing said support to said vehicle.

11. The load carrier as recited in claim 10, wherein said bracket means for each support comprises at least two spaced-apart, rectangularly-shaped brackets for surrounding and supporting the external surface of each of said telescoping channel support, a flange secured to the vehicle frame adjacent to the rear of the vehicle, and a post having one end secured to said rectangularly-shaped bracket, the opposite end of said post being demountably coupled to said flange.

12. The load carrier as recited in claim 11, wherein said flange comprises A pair of U-shaped bolts for surrounding the vehicle frame and securing said flange to the vehicle, said flange including a central, threaded bushing for receiving a corresponding thread formed on the opposite end of said post.

13. A retractable load carrier for cantilever support of loads from the rear of a vehicle, comprising:

a pair of spaced-apart, elongated telescoping channel supports disposed in the direction of travel of the vehicle, each support having a plurality of elongated, hollow, rigid channels nesting one within the other;

bracket means coupled to the outside channel of each telescoping support for securing said support to said vehicle, said bracket means for each support comprising at least two spaced-apart, rectangularly-shaped brackets for surrounding and supporting the external surface of each of said telescoping channel support, a flange secured to the vehicle frame adjacent to the rear of the vehicle, and a post having one end secured to said rectangularly-shaped bracket, the opposite end of said post being demountably coupled to said flange, said flange comprising a pair of U-shaped bolts for surrounding the vehicle frame and securing said flange to the vehicle, said flange including a central, threaded bushing for receiving a corresponding thread formed on the opposite end of said post.

* * * * *